Figure 11:
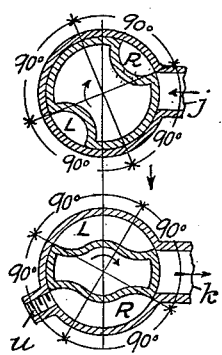
Figure 12:
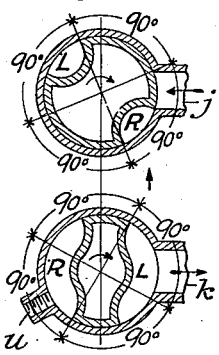
Figure 13:
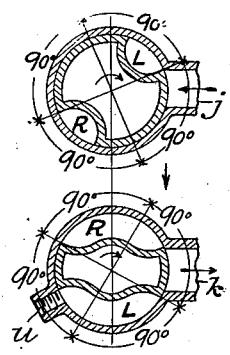
Figure 14:
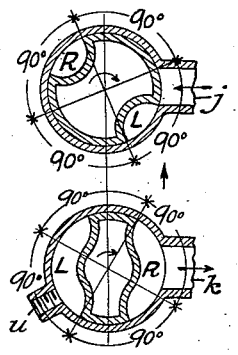
Figure 15:
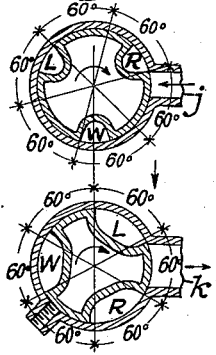
Figure 16:
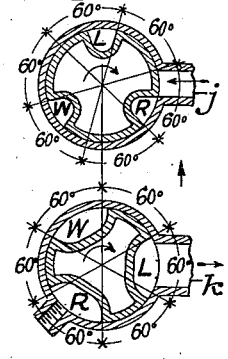
Figure 17:
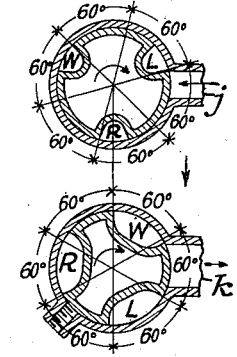
Figure 18:
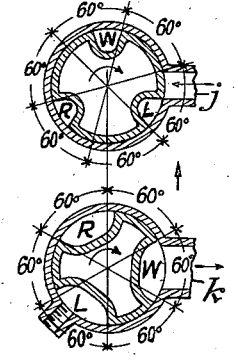
Figure 19:
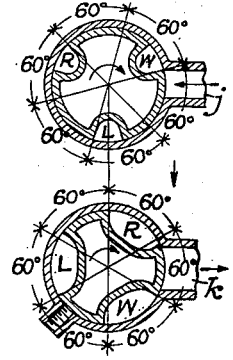
Figure 20:
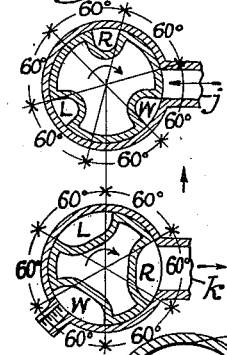

Oct. 11, 1932.  J. G. C. MANTLE  1,881,789
INTERNAL COMBUSTION ENGINE
Original Filed June 30, 1923  2 Sheets-Sheet 1
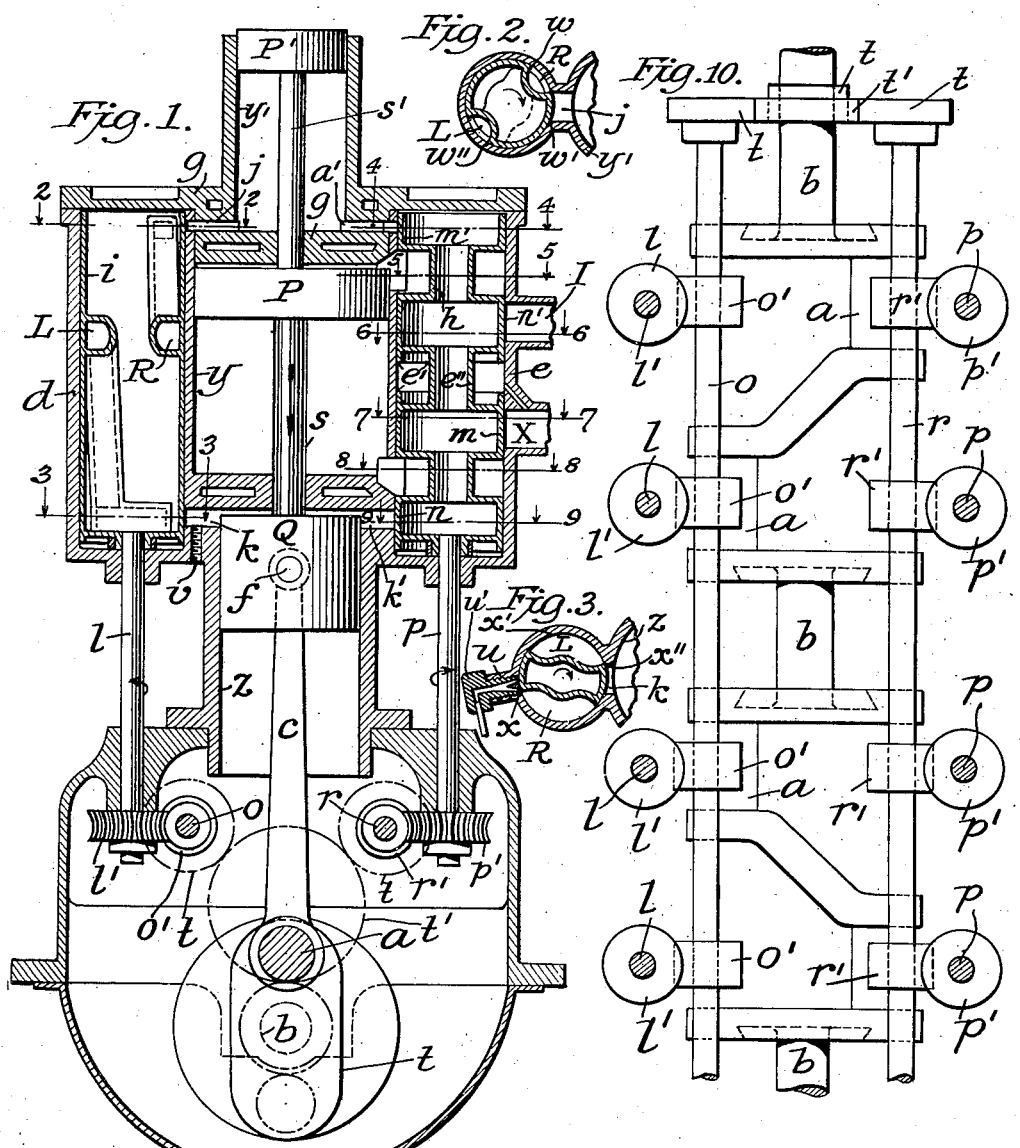
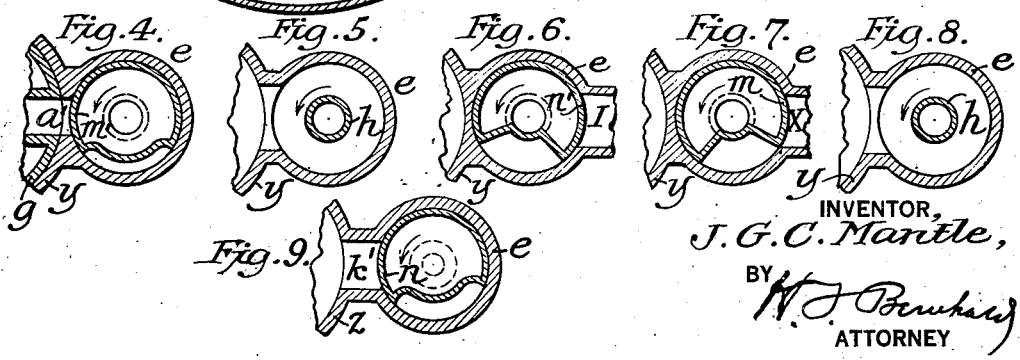
INVENTOR,
J. G. C. Mantle,
BY
ATTORNEY Oct. 11, 1932.  J. G. C. MANTLE  1,881,789
INTERNAL COMBUSTION ENGINE
Original Filed June 30, 1923   2 Sheets-Sheet 2

INVENTOR
BY Joseph G. C. Mantle
ATTORNEY

Patented Oct. 11, 1932

1,881,789

UNITED STATES PATENT OFFICE

JOSEPH G. C. MANTLE, OF LEONIA, NEW JERSEY

INTERNAL COMBUSTION ENGINE

Original application filed June 30, 1923, Serial No. 648,783. Divided and this application filed July 9, 1926. Serial No. 121,320.

This invention is a new or improved internal combustion engine, where several pistons, connected together in tandem, operate a single crank-pin of the engine.

This application is a division of my application for a patent, Serial No. 648,783, filed June 30, 1923, for internal combustion engine.

The aim of this invention is the provision of an engine, operable either on the explosion plan or on the continuous combustion plan, which may be operated at a very high speed in an economical manner and yet be of comparatively light weight. The aim is also to provide an engine with interchangeable parts by means of which it may be operated with various kinds of liquid fuel; its especial aim is the provision of an engine, operating in an economical manner at a very high speed and using the kind of liquid fuel which is used in Diesel engines.

To this end, the pistons are cushioned by the working fluid at both ends of their strokes, and there is both a two-stage working cycle and a two-stage compression cycle, the second stage compression cycle being synchronous with the first stage working cycle.

By the explosion plan is meant that wherein the fuel is intermingled with the air prior to its compression; by the continuous combustion plan is meant that wherein the fuel is added to the air subsequent to compression. By working fluid is meant the mixture of air and fuel, or, air alone, as the case may be, which is admitted to the engine and this meaning extends to it during all the cycles of operation.

In the drawings:

Figure 1 is a sectional elevation through a preferred form of the engine.

Figures 2, 3, 4, 5, 6, 7, 8 and 9 are transverse sections through 2—2; 3—3; 4—4; 5—5; 6—6; 7—7; 8—8 and 9—9, respectively, of Figure 1.

Figure 10 is the plan of a preferred arrangement of crank-shaft and valve-driving mechanism for coupling four sets of the tandem pistons shown in Figure 1.

Figures 11 to 14, inclusive, show the positions of the inlets and outlets of a set of two charge chambers relative to the outlet of the second stage compression chamber and to the inlet of the first stage working chamber.

Figures 15 to 20, inclusive, show the positions of the inlets and outlets of a set of three charge chambers relative to the outlet of the second stage compression chamber and to the inlet of the first stage working chamber.

Figures 21, 22:
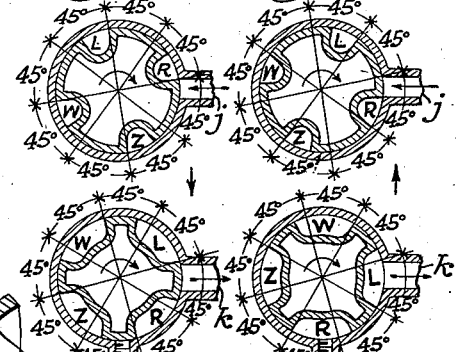

Figures 21 and 22 show the positions of the inlets and outlets of a set of four charge chambers relative to the outlet of the second stage compression chamber and the inlet of the first stage working chamber.

Referring to Figure 1, $z$, $y$, $y'$ are cylinders in which, respectively, are pistons $Q$, $P$, and $P'$, connected in tandem by piston rods $s$ and $s'$. Piston $Q$ is provided with a wrist-pin $f$ by which it is coupled by the connecting rod $c$ to the crank-pin $a$ of the crank-shaft $b$ of the engine. Connected with the cylinders $z$, $y$ and $y'$, preferably integral with cylinders $z$ and $y$, are two cylindrical chambers $d$ and $e$. Secured to the chambers $d$, $e$ and cylinder $y$ is a cover $g$ of which the cylinder $y'$ forms an integral part thereof. Rotatable within the chamber $D$ is a hollow cylindrical body $i$ the inner cylindrical portion of which is provided with chambers $R$ and $L$ extending spirally upwardly and downwardly. Each of these chambers has an inlet adapted, upon the rotation of the body $i$, to communicate with the outlet $j$ of the cylinder $y'$, and also an outlet for similarly communicating with the inlet $k$ of the cylinder $z$. Chambers $R$ and $L$ will be referred to as charge chambers. The cylindrical chamber $e$ is provided with an inlet $I$ for the admittance of the mixture of air and fuel, or air alone, as may be in accordance to whether the engine is operated on the explosion or the continuous combustion plan. It is also provided with an outlet $X$ for the emergence of the exhausted working fluid. Rotatable within the chamber $e$ is a valve $h$ provided with a portion $n'$ adapted, upon the rotation of the valve, to open and close the inlet $I$, a portion $m$, similarly, to open and close the outlet $X$, a portion $n$ to open and close the outlet $k'$ of cylinder $z$, and a portion $m'$ to open and close the inlet a' of cylinder y'. Secured to body i is a shaft l on the lower end of which is secured a worm-wheel l meshing with a worm o' secured to a shaft o. Secured to valve h is a shaft p on the lower end of which is secured a worm-wheel p' meshing with a worm r' secured to a shaft r. Secured to the shafts o and r and to the crank-shaft b are spur gears t which mesh with an intermediate spur gear t'. The worm-wheel l' and worm o' are so proportioned that the body i rotates through 180° during each rotation of the crank-shaft b. The worm-wheel p' and worm r' are so proportioned that the valve h rotates once during each rotation of the crank-shaft b.

During the downward strokes of the pistons, the space in cylinder z above the piston Q serves as the first stage working chamber and the space in cylinder y' below the piston P' as the second stage compression chamber. During the upward strokes, the space in cylinder y below the piston P serves as the second stage working chamber and the space above the piston as the first stage compression chamber. Thus the first stage of the working cycle is synchronous with the second stage of the compression cycle, and the second stage of the working cycle with the first stage of the compression cycle.

Piston Q has but a working clearance when at the end of its upward stroke, piston P' at the end of its downward stroke, and piston P at the end of both its downward and upward strokes. Cylinder y is always open to the chamber e as may be clearly seen by reference to Figures 1, 5 and 8. The central portion of the space of chamber e is shut off from the upper and lower portions by the continuous and openless annular flanges e' bounding the cylindrical portion e'' of valve h.

The operation is as follows: Referring to the drawings which show the relative positions of the parts at the commencement of a downward stroke of the pistons. Soon after the commencement of the stroke the portion n' of valve h opens the inlet I and during the remainder of the stroke a mixture of air and fuel, or, of air alone, as the case may be, passes through the chamber e into the cylinder y above the piston P. The portion m' of valve h closed the inlet a' of cylinder y' throughout the stroke, see Figure 4. This is the induction cycle and occurs during each downward stroke of the pistons.

At the commencement of the upward stroke the body i had rotated through 90° during the preceding stroke and the following edge w of the inlet of a charge chamber had closed the outlet j of cylinder y' and is now at w', see Figure 2; also, the inlet I is still open, although about to be closed by the portion n' of valve h. Soon after the commencement of the stroke the portion n' closes the inlet I and immediately afterward its portion m' opens the inlet a' of cylinder y' and the piston P during the remainder of the stroke compresses the charge of working fluid from cylinder y into the smaller cylinder y' below the piston P'. The outlet j was closed by the body i throughout the stroke and the inlet a' was closed by the portion m' at, or, immediately before the end of the stroke. This is the first stage of the compression cycle and occurs during each upward stroke of the pistons.

Figure 3A:
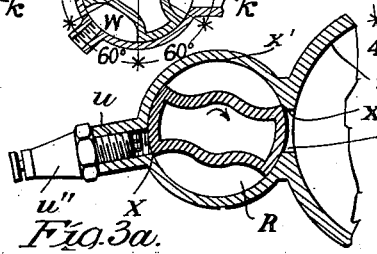

Figures 2 and 3 show the positions of the inlets and outlets of the charge chambers relative to the outlet j of cylinder y' and to the inlet k of cylinder z, respectively, when the pistons are at the commencement of a downward stroke. The inlet of charge chamber R is about to open to cylinder y' and the outlet of that charge chamber had already closed to cylinder z. The cubical capacity of the charge chambers R and L are equal to each other and that of each is much less than that of cylinder y' below the piston P'. Immediately after the commencement of the down stroke, the inlet of R opened to cylinder y' and the piston P' compresses the charge of working fluid from cylinder y' into the charge chamber R. At the end of the stroke the following edge w of the inlet of R has rotated through 90° and has closed the outlet j of cylinder y' and the charge of working fluid which was in cylinder y' is now compressed and confined in charge chamber R. This is the second stage of the compression cycle and occurs during each downward stroke of the pistons.

At the commencement of the following stroke, an upward stroke, of the pistons, the following edge w of the inlet and the leading edge x of the outlet of R are each 90° in advance of the positions shown in Figures 2 and 3, and are now at w' and x', respectively. During this stroke these edges rotate through another 90° and at the end of the stroke are at w'' and x'', respectively, and the charge chamber R occupies the position shown in Figures 2 and 3 of charge chamber L and the outlet of R is about to open the inlet k of cylinder z. Thereupon, the charge of working fluid was confined in the charge chamber R for a duration greater than that of this entire stroke of the pistons. This will be termed the retention cycle and occurs during each upward stroke of the pistons.

At the commencement of the following stroke, a downward stroke of the pistons, the outlet of R is about to open to cylinder z and the inlet of L to cylinder y' which, whilst remembering that R now occupies the shown position of L and that L the position of R, may be seen by inspection of Figures 2 and 3. Also the portion n of valve h had already closed the outlet k' of cylinder z, see Figure 9. While the charge is held in the charge chamber it is ignited by a charge of oil from the fuel nozzle $u'$ inserted in opening $u$, or may be ignited by means of the spark plug $u''$ which may be inserted in opening $u$ instead of the fuel nozzle $u'$. Immediately upon the commencement of the stroke the outlet of R opens to the inlet $k$ of cylinder $z$ and the charge of compressed working fluid is released from the charge chamber R into the cylinder $z$ above the piston Q and expands during the remainder of the stroke. The outlet $k'$ is closed by the portion $n$ throughout the stroke. This is the first stage of the working cycle and occurs during each downward stroke of the pistons.

At the commencement of the following stroke, an upward stroke, of the pistons, the charge chamber R is open to cylinder $z$ and the outlet $k'$ closed by the portion $n$. Very shortly after the commencement of the stroke the portion $n$ opened the outlet $k'$ and the working fluid in cylinder $z$ and in charge chamber R expands into the larger cylinder $y$ below the piston P. When the pistons are near the end of their stroke the inlet $k$ is closed by the body $i$ and the outlet $k'$ is closed by the portion $n$ and a portion of the working fluid is entrapped above piston Q in cylinder $z$ which serves to cushion the pistons and start their following stroke. The exhaust outlet X was closed at the commencement and opened near the end of the stroke by the portion $m$ of valve $h$. This is the second stage of the working cycle and occurs during each upward stroke of the pistons.

At the commencement of the following stroke, a downward stroke of the pistons, the portion $n$ had closed the outlet $k'$ and the portion $m$ had opened the exhaust outlet X. During this stroke the exhausted working fluid passes from the cylinder $y$ below the piston P through the exhaust outlet X. When near the end of the stroke, the portion $m$ closes the exhaust outlet X and a portion of the exhausted working fluid is entrapped in cylinder $y$ below the piston P which serves to cushion the pistons and start their following stroke. This is the exhaust cycle and occurs during each downward stroke of the pistons.

At the end of each downward and upward stroke of the pistons, or rotation of the crank shaft, a charge-chamber has rotated through 180° and exactly occupies the position which was held by the other charge chamber at the end of the two preceding strokes, and so, with the exception of the substitution of the one charge chamber for the other, the operation is exactly the same for any two consecutive strokes.

As so far explained the duration of the retention cycle is that of a stroke of the pistons, but this duration may be extended as much as desired and in certain instances is very advantageous. If the body $i$ comprises a set of two charge chambers as shown in Figures 1, 2 and 3, it rotates through 90° for each stroke of the pistons, but if the number of charge chambers be increased, then its angular movement relative to that of the crank-shaft is decreased. For instance, if there are three charge chambers to the body $i$ then it is rotated once to each three rotations of the crank-shaft (the worm-wheel $l'$ and worm $o'$ being proportioned to effect this), and each charge chamber rotates through 60° during each stroke of the pistons and as a consequence each charge of working fluid is confined in a charge chamber during three strokes of the pistons. In other words, when three charge chambers are used in connection with cylinders $y'$ and $z$ then the duration of the retention cycle is that of three strokes of the pistons. A set of three or more charge chambers is arranged around the inner cylindrical surface of body $i$ as shown in Figure 1 and the inlets and outlets are spaced equally apart as shown in Figures 2 and 3 and the angular movement relative to that of the crank-shaft is always the fraction having the numeral 1 for its numerator and the numeral denoting the number of charge chambers for its denominator.

Figures 11 to 14, inclusive, show the positions of the inlet and outlet of each charge chamber of a set of two charge chambers in respect, respectively, to the outlet $j$ of the second stage compression chamber $y'$, and to the inlet $k$ of the first stage working chamber at the very commencement of four consecutive strokes of the pistons P', P and Q. The upper portion of each of the Figures 11 to 22, inclusive, is a transverse section through the aforesaid inlets of the charge chambers and the outlet of the aforesaid compression chamber: and the lower portion of each figure, the outlets of the charge chamber and the inlet of the working chamber. In each of the figures the direction in which the pistons are about to make their stroke is denoted by a vertical arrow. The sections in Figure 11 correspond to those of Figures 2 and 3, excepting that the characters $w$, $w'$, $w''$, and $x$ are absent, as they are not needed in this further explanation. Figures 11 to 14, inclusive, show that the set of two charge chambers R and L rotates through ninety degrees during each stroke of the pistons, therefore the crank shaft makes two rotations to one rotation of the charge chambers. The figures also show that the following is true of either the charge chamber R or the charge chamber L. The charge chamber had closed to the inlet $k$ of the working chamber and is about to open to the outlet $j$ of the compression chamber at the commencement of every other downward stroke, or every fourth stroke of the pistons, or, which is the same thing, at the same point in every other rotation of the crank shaft. The charge chamber receives a charge of working fluid through the outlet *j* of the compression chamber during every other downward stroke, or every fourth stroke of the pistons; or, which is the same thing, during every other rotation of the crank shaft. The charge chamber confines its charge of working fluid at the very commencement of a stroke of the pistons and does not release it to the inlet *k* of the working chamber until after the commencement of the following stroke; therefore, the charge is confined in its chamber for a duration greater than that of a stroke of the pistons. The charge chamber releases its charge to the inlet *k* of the working chamber shortly after the commencement of a downward stroke of the pistons and the charge chamber remains open to that inlet until towards the end of the following working stroke.

Figures 15 to 20, inclusive, show the position of the inlet and outlet of each charge chamber of a set of three charge chambers in relation to, respectively, the outlet *j* of the compression chamber and to the inlet *k* of the working chamber. The figures show that the set of three charge chambers R, L and W rotates through sixty (60) degrees during each stroke of the pistons. They also show that the following is true of either one of the chambers R, L and W. The chamber had closed to the inlet *k* of the working chamber and is about to open to the outlet *j* of the compression chamber at the commencement of every third downward stroke, or every sixth stroke of the pistons, or, which is the same thing, at the same point in every third rotation of the crank shaft. The charge chamber receives a charge of working fluid through the outlet *j* of the compression chamber during every third downward stroke, or every sixth stroke of the pistons, or, which is the same thing, during every third rotation of the crank shaft. The charge chamber confines its charge of working fluid at the very commencement of a stroke of the piston and does not release it to the inlet *k* of the working chamber until after the commencement of the third following stroke; therefore, the charge is confined in its chamber for a duration greater than that of the three consecutive strokes of the pistons. The charge chamber releases its charge to the inlet *k* of the working chamber shortly after the commencement of a downward stroke of the pistons and the charge chamber remains open to that inlet until towards the end of the following upward movement of the piston Q.

Figures 21 and 22 show the positions of the inlet and outlet of each of a set of four charge chambers, in relation to, respectively, the outlet *j* of the compression chamber and to the inlet *k* of the working chamber. The figures show that the set of four charge chambers R, L, W and Z rotates through forty-five degrees during each stroke of the piston. They also show, in conjunction with what is shown in Figures 11 to 20, inclusive, that the following is true of either one of the chambers R, L, W and Z. The charge chamber had closed to the inlet *k* of the working chamber and is about to open the outlet *j* of the compression chamber at the commencement of every fourth downward stroke, or every eighth stroke of the pistons, or, which is the same thing, at the same point in every fourth rotation of the crank shaft. The charge chamber receives a charge of working fluid through the outlet *j* of the compression chamber during every fourth downward stroke of the pistons, or, which is the same thing, during every fourth rotation of the crank shaft. The charge chamber confines its charge of working fluid at the very commencement of a stroke of the pistons and does not release it to the inlet *k* of the working chamber until after the commencement of the fifth following stroke; therefore, the charge is confined in its chamber for a duration greater than that of the five consecutive strokes of the pistons. The charge chamber releases its charge to the inlet *k* of the working chamber shortly after the commencement of a downward stroke and the charge chamber remains open to that inlet until towards the end of the following stroke.

The number of charge chambers in the set of charge chambers is dependent on the kind of fuel comprising the fuel element of the working fluid and also upon the required speed of the engine. With a fuel of rapid combustion, such as gasoline, two charge chambers to the set is sufficient for a high speed of engine, although for a still higher speed, three to the set would be necessary. With fuel of slow combustion, and a required high speed of the engine, several charge chambers to each set are necessary. The only change required when using a different number of charge chambers to the set is in the angular velocity of the body *i* in relation to the crank shaft. Now the body *i* containing two charge chambers may be of the same diameter and interchangeable with another body *i* having several charge chambers. Thus, this engine, provided with interchangeable sets of charge chambers, each set adapted to be rotated at the correct speed by one of a set of worms mounted on a shaft of the engine. This engine being provided with means by which either a fuel nozzle *u'* or an ignition plug *u* is used in connection with each charge chamber is operable with various kinds of liquid fuel forming the fuel element of its working fluid, and can operate at high and very high speeds irrespective of the kind of liquid fuel used therein. The duration of the retention cycle is always that of an odd number of strokes of the pistons; for the duration of the charging and discharging of a charge chamber is the duration of three strokes of the pistons and whether the crank-shaft makes an even or an odd number of rotations to one of the body *i* yet the number of piston strokes is necessarily an even number.

The hitherto slow speed of engines operated on the continuous combustion plan as compared with those on the explosion plan is mainly due to the comparatively slow speed of combustion of the former. In this engine the combustion is commenced and to any desired extent completed prior to the admittance of the working fluid to the working chamber and whilst the charge is confined in its charge chamber. For this purpose the cylindrical chamber *d* is provided with a hole *u*, see Figure 3, adapted to receive either the usual ignition plug, or, the usual fuel nozzle. The interior of each of the charge chambers, during the rotation of the body *i*, is in communication with this hole *u* and the ignition of the mixture of compressed air and fuel, or, the addition of the fuel to the compressed air, as the case may be, is effected and the combustion to any desired extent completed whilst the charge is comfined in its charge chamber and during the working cycle of a charge previously released to the working chamber. A description of the ignition plug or the fuel nozzle along with their necessary accessories and their application is unnecessary for they are all known and understood.

The threaded hole *v* which is open to the passage *k* and is shown in Figure 1, is for the attachment of either an electric ignition plug or an electric heater plug. This is an auxiliary appliance which is of service especially when starting the engine when in cold condition, and is not claimed as part of this invention. Such plugs and the method of their operation is well known and further explanation is unnecessary.

As the pistons are cushioned by the working fluid at both ends of all their strokes, the friction on the crank-pin and bearings is very greatly reduced: also there is a great economy in the use of the working fluid for it is exhausted working fluid which fills the space in the working chambers when the connecting rod is at an ineffective angle in relation to the crank. Also, on account of this cushioning the mass of the several pistons in tandem is not detrimental but is advantageous because during the earlier part of the stroke energy is stored in the mass and directly returned during the latter part of the stroke.

The increased momentum due to pistons arranged in tandem need cause no increase in vibration for the means of balancing the reactions of moving masses is well known and understood in its application to internal combustion engines. A preferred means for this purpose and for the actuating of the body *i* and the valve *h* is shown in Figure 10 which drawing is self-explanatory when considered in connection with the description of the other figures.

There has been described, herein, and the drawings show, a preferred form of engine which is noiseless, and wherein the only reciprocating parts are the pistons in tandem and the connecting rod which connect them to a single crank-pin of the crank-shaft. Yet it must be distinctly understood that this invention is not restricted to that form, and that this invention is broadly the combination of a plurality of cylinders, a plurality of charge chambers, a plurality of pistons connected together in tandem and operating a single crank-pin of the crank-shaft of the engine along with means functioning as herein described and as will be set forth in the claims. For instance, the plurality of charge chambers associated with a working chamber is not restricted to any particular number, neither is it necessary that they rotate, for they may be stationary and their inlets and outlets controlled by valves. Also the inlets of the compression chambers and the outlets of the working chambers and the outlet of the first stage compression chamber may be controlled by valves instead of by the single valve *h*.

Having thus fully described the invention, what I claim as new and desire to secure by Letters Patent is:

1. In a combustion engine a plurality of cylinders, a plurality of pistons rigidly connected in tandem having a reciprocating motion in said cylinders; the said plurality of cylinders forming a set of chambers wherein both the compression and the working cycles of the working fluid are effected in a plurality of stages; a plurality of charge-chambers each communicating with the last stage compression chamber and the first stage working chamber; means for compressing into, confining and isolating a charge of compressed working fluid in each of the charge-chambers, and means for releasing to the first stage working chamber one of said charges during each stroke in the same direction of the set of pistons.

2. In a combustion engine, the combination of a crank shaft, a plurality of cylinders, a plurality of charge chambers, a plurality of pistons connected together in tandem, one piston in each cylinder, one of said pistons being connected to the crank shaft to operate the same, one of said cylinders serving as a compression chamber and also as a second stage working chamber for the working fluid, another of said cylinders serving as a second stage compression chamber for the working fluid, and another of said cylinders serving as the first stage working chamber for the working fluid, each of said charge chambers having communication with the outlet of the second stage compression chamber and with the inlet of the working chamber, means permitting communication between said compression chamber and said second stage compression chamber, valve means for controlling communication between the said compression chamber and said second stage compression chamber, means affording communication between said working chamber and said charge chambers, whereby the first working stroke and the second stage compression stroke are effected during each stroke of the pistons in one direction and a second stage working stroke and a first stage compression stroke during each stroke of the pistons in the opposite direction.

3. In a combustion engine, the combination of a crank shaft, a plurality of cylinders, a plurality of charge chambers communicating with said cylinders, and a plurality of pistons connected together in tandem, one piston in each cylinder, one of said pistons being operatively connected to the crank shaft, one of the said cylinders serving as a working chamber for the working fluid and another of said cylinders serving as a second stage working chamber for the working fluid, valve means for controlling communication between said charge chambers and said working chambers, means for operating said valve means whereby said pistons are cushioned during the latter portion of each stroke of the pistons in one direction by a portion of the exhaust working fluid entrapped in the said working chamber, and are cushioned during the latter part of each stroke of the pistons in the other direction by a portion of the exhaust working fluid entrapped in the said second stage working chamber.

4. In a combustion engine, the combination of a crank shaft, a plurality of cylinders, a plurality of charge chambers communicating with said cylinders, and a plurality of pistons connected together in tandem, one piston in each cylinder, one of said pistons being operatively connected to the crank shaft, one of the said cylinders serving as a working chamber for the working fluid and another of said cylinders serving as a second stage working chamber for the working fluid, means for controlling the communication between said charge chambers and said working chamber and valve means between said working chamber and said second stage working chamber, means for operating said valve means whereby said pistons are started at the commencement of each of their strokes in either direction by a portion of the exhaust working fluid entrapped in said working chambers.

5. In a combustion engine, the combination of a crank shaft, a plurality of cylinders, a plurality of charge chambers communicating with said cylinders, and a plurality of pistons connected together in tandem, one piston in each cylinder, one of said pistons operatively connected to the said crank shaft, one of said cylinders serving as a compression chamber for the working fluid, and another of said cylinders serving as a working chamber for the working fluid, valve means controlling the communication between said charge chambers, compression chamber and working chamber, means for operating said valve means whereby a charge of working fluid is compressed from said compression chamber into one of the charge chambers during each stroke of the pistons in the same direction, and is then confined therein for a period greater in duration than that of a piston stroke, and whereby a charge of working fluid is released from another of said charge chambers into said working chamber during each stroke in the same direction of the pistons.

6. In a combustion engine, the combination of a crank shaft, a plurality of cylinders, a plurality of charge chambers equal to or greater in number than the cylinders and communicating with said cylinders, and a plurality of pistons connected together in tandem, one piston in each cylinder, one of said pistons operatively connected to the said crank shaft, one of said cylinders serving as a compression chamber for the working fluid, and another of said cylinders serving as a working chamber for the working fluid, valve means controlling the communication between said charge chambers, compression chamber and working chamber, means for operating said valve means whereby a charge of working fluid is compressed from said compression chamber into one of the charge chambers during each stroke of the pistons in the same direction, and is then confined therein during several successive strokes of the pistons, and whereby a charge of working fluid is released from another of said charge chambers into said working chamber during each stroke in the same direction of the pistons.

7. In a combustion engine, the combination of a crank shaft, a plurality of cylinders, a plurality of charge chambers communicating with said cylinders, and a plurality of pistons connected together in tandem, one piston in each cylinder, one of said pistons operatively connected to the said crank shaft, one of said cylinders serving as a compression chamber for the working fluid, and another of said cylinders serving as a working chamber for the working fluid, valve means controlling the communication between said charge chambers, compression chamber and working chamber, means for operating said valve means whereby a charge of working fluid is compressed from said compression chamber into one of the charge chambers during each stroke in the same direction of the pistons, and then confined therein for a period prior to its release therefrom, and whereby a charge of working fluid is released from another of said charge chambers into said working chamber during each stroke of the pistons in the same direction, and means whereby a combustion of the charge of working fluid is effected during the said period of its confinement in the charge chamber.

8. In a combustion engine, the combination of a crank shaft, a plurality of cylinders, a plurality of charge chambers communicating with said cylinders, a plurality of pistons in tandem, one piston in each cylinder, and one of said pistons operatively connected to said crank shaft, a rotary valve said cylinders serving jointly as a first stage compression chamber, second stage compression chamber, first stage working chamber and second stage working chamber for the working fluid, said rotary valve being operatively connected to said crank shaft so as to rotate turn for turn therewith, means for operating said rotary valve to control the inlet and outlet of the first stage compression chamber, the inlet of the second stage compression chamber, the outlet of the first stage working chamber and the inlet and outlet of the second stage working chamber.

9. In a combustion engine, the combination of a crank shaft, a plurality of cylinders, a plurality of charge chambers communicating with said cylinders, a plurality of pistons in tandem, one piston in each cylinder, and one of said pistons operatively connected to said crank shaft, a rotary valve, one of said cylinders serving as a compression chamber and second stage working chamber and another of said cylinders serving as a first stage working chamber, said rotary valve being operatively connected to said crank shaft to rotate turn for turn therewith, means for operating said rotary valve to control the inlet and outlet of the compression chamber and the inlet and outlet of the second stage working chamber.

10. In a combustion engine, the combination of a crank shaft, a plurality of cylinders, a plurality of charge chambers adapted to communicate with certain of said cylinders, and a plurality of pistons connected together in tandem, one piston in each cylinder, one of said pistons being connected to the said crank shaft, one of said cylinders serving as a first stage compression chamber, another of said cylinders serving as a second stage compression chamber for the working fluid and another of said cylinders serving as a working chamber for the working fluid, valve means for controlling the communication between said charge chambers, said second stage compression chamber and said working chamber, means for operating said valve means whereby the charge of working fluid is compressed into and confined in one of said charge chambers from the second stage compression chamber and a charge of working fluid is released from another of the charge chambers into said working chamber during each rotation of said crank shaft.

11. A combustion engine, the combination of a crank shaft, a plurality of cylinders, a plurality of charge chambers, a plurality of pistons connected together in tandem, one piston in each cylinder, one of said pistons being connected to the crank shaft to operate the same, one of said cylinders serving as a compression chamber for the working fluid, another of said cylinders serving as a second stage compression chamber, and another of said cylinders serving as a working chamber for the working fluid, each of said charge chambers having communication with the outlet of the second stage compression chamber and with the inlet of the working chamber, means connecting said compression chamber and said second stage compression chamber, valve means for controlling communication between the said compression chamber and said second stage compression chamber, means affording communication between said working chamber and said charge chambers, whereby the working stroke and a second stage compression stroke are effected during each stroke of the pistons in one direction and the second stage working stroke and a compression stroke during each stroke of the pistons in the opposite direction.

12. A combustion engine comprising a crank shaft, a plurality of cylinders, a movable body formed with a plurality of charge chambers adapted to communicate with certain of said cylinders, a plurality of pistons arranged in tandem, one piston in each cylinder, one of said pistons being operatively connected to said crank shaft, and means including a rotary valve adapted to admit working fluid to a plurality of said cylinders at predetermined intervals, said rotary valve being operatively connected to said crank shaft.

In testimony whereof I have hereto signed my name this 23rd day of June, 1926.

JOSEPH G. C. MANTLE.